United States Patent
Lin et al.

(10) Patent No.: US 8,271,489 B2
(45) Date of Patent: Sep. 18, 2012

(54) PHOTO BOOK SYSTEM AND METHOD HAVING RETRIEVABLE MULTIMEDIA USING AN ELECTRONICALLY READABLE CODE

(75) Inventors: Qian Lin, Santa Clara, CA (US); Niranjan Damera-Venkata, Sunnyvale, CA (US); Jonathan Yen, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2127 days.

(21) Appl. No.: 10/286,098

(22) Filed: Oct. 31, 2002

(65) Prior Publication Data
US 2004/0088326 A1    May 6, 2004

(51) Int. Cl.
*G06F 17/30* (2006.01)
*G06F 17/00* (2006.01)
(52) U.S. Cl. ......... 707/736; 707/899; 715/202; 382/321
(58) Field of Classification Search ................ 707/1–10, 707/100–104.1, 200–206, 736, 899; 715/500, 715/506, 202–203, 500.1, 501.1; 355/27; 379/84.14, 84; 382/321
See application file for complete search history.

(56) References Cited

U.S. PATENT DOCUMENTS

| | | | |
|---|---|---|---|
| 5,781,914 A | 7/1998 | Stork et al. ..................... 715/506 |
| 5,805,152 A | 9/1998 | Furusawa ................... 715/501.1 |
| 6,035,308 A | 3/2000 | Yano et al. .................. 715/501.1 |
| 6,147,742 A * | 11/2000 | Bell et al. ......................... 355/27 |
| 6,421,470 B1 * | 7/2002 | Nozaki et al. ................. 382/321 |
| 6,623,528 B1 * | 9/2003 | Squilla et al. ................. 715/202 |
| 6,700,992 B1 * | 3/2004 | Yu et al. ........................ 382/100 |
| 6,760,884 B1 * | 7/2004 | Vertelney et al. .......... 715/500.1 |
| 6,873,687 B2 * | 3/2005 | Smith, II .................... 379/88.14 |

* cited by examiner

*Primary Examiner* — Yicun Wu

(57) ABSTRACT

A photo book system and method with associated multimedia is disclosed. One embodiment of the present invention provides a photo book including an image and an electronically readable code associated with the image. The electronically readable code is used for retrieving a multimedia file that corresponds to the image.

33 Claims, 11 Drawing Sheets

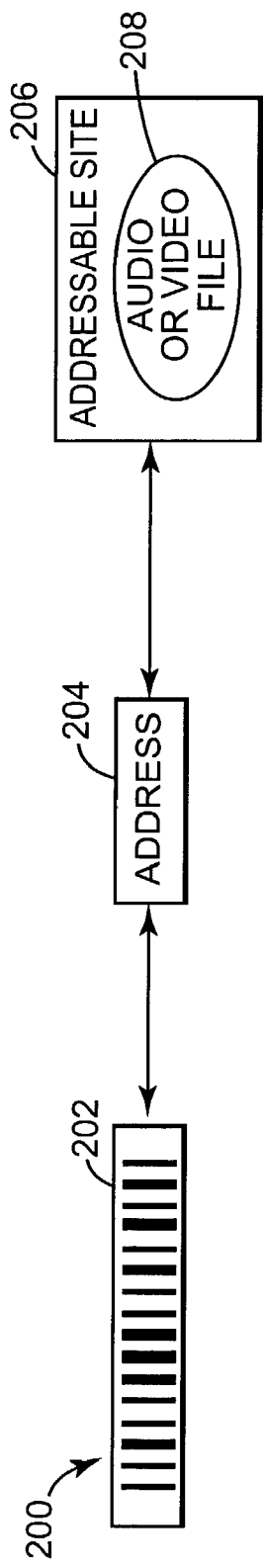
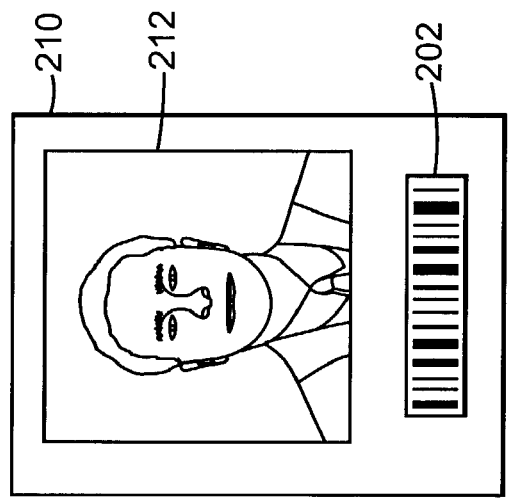
Fig. 6
Fig. 7

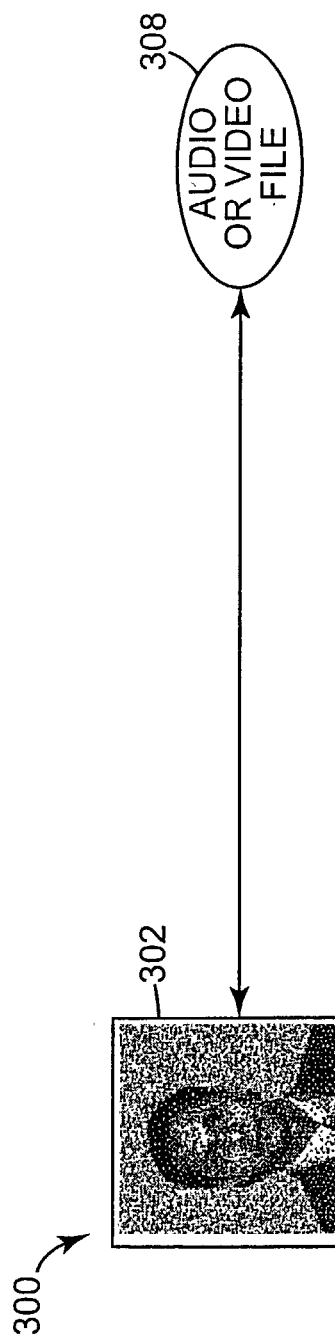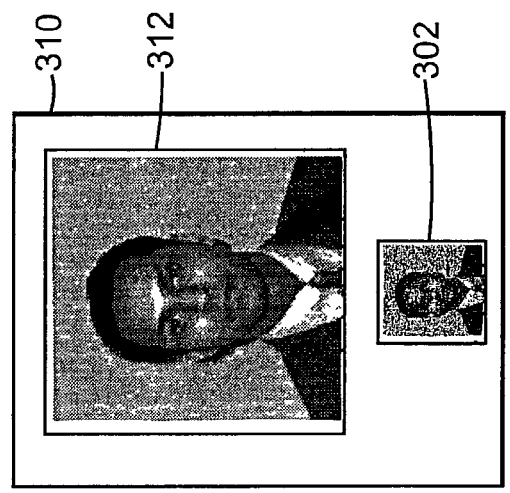
Fig. 10
Fig. 11

PHOTO BOOK SYSTEM AND METHOD HAVING RETRIEVABLE MULTIMEDIA USING AN ELECTRONICALLY READABLE CODE

CROSS-REFERENCE TO RELATED APPLICATIONS

This patent application is related to Non-Provisional U.S. patent application Ser. No. 10/027,523, entitled "Generating Graphical Bar Codes by Halftoning with Embedded Graphical Encoding," filed on Dec. 19, 2001, assigned to the Assignee of the present invention, and incorporated herein by reference.

FIELD OF THE INVENTION

The present invention relates to a photo book system and method. More particularly, this invention relates to a photo book system and method associating an electronically readable code corresponding with an image and using the electronically readable code to retrieve a corresponding multimedia (e.g., audio or video) file.

BACKGROUND OF THE INVENTION

Photographs and videos are commonly used to capture the memories of the events in one's life. The collection and storage of such items is necessary for viewing and sharing of the memories captured in the photographs and videos. Traditional systems and methods of organizing and collecting photos involve a time-intensive process of collecting and organizing developed prints and manually placing them into photo albums. In the wake of advancing photographic technology, digital cameras and readers have been introduced and have digitized the photographic standard. As a result, advanced systems and methods of photograph and video organization have developed.

One such organization and collection method allows digital photographs to be sorted, organized, and arranged via a personal computer. The personal computer contains a communication link to either a photo organization program or a website offering photo organization services. Upon organizing and arranging digital photographs, the individual photographs or sheets of organized photos may be printed by either a home printer or an online photo finishing provider. This method successfully preserves and displays the visual images depicted in basic photographs.

However, the digital cameras of today, unlike the early predecessors, are able to capture sound and video as well as photographs. Storage of related audio and video files is not conducive to the traditional methods of storing still photographic prints. Conventional systems and methods of storing and organizing photographs display and print the visual images depicted in photographs or individual video frames and discards the related video and audio files.

Photo display frames have been developed, which incorporate an audio system into a frame. The audio system allows messages to be recorded to a microprocessor included in the frame and played back at a subsequent time. Although this system of photograph display allows integrated storage and playback of audio files in conjunction with viewing the still photographs, each audio file must be manually recorded into the frame. Furthermore, only a limited number of files can be recorded onto the frame microprocessor. Each time the pictures in the frame are changed, new files must be recorded and the old audio files are discarded. As a result, the audio photo display frame does not allow direct upload of previously captured audio files and it is not conducive for use with large or multiple photo books. Moreover, the audio photo display frame is not capable of storing and playing video files related to the photographic image displayed.

The deficiencies of the above described photograph storage and organization systems and methods are frustrating to users who commonly want to review and share their organized photographs in conjunction with the corresponding audio and video files. Therefore, for the reasons stated above and for reasons presented in greater detail in the Description of the Preferred Embodiment section of the present specification, a need exists for a photo book system in which the audio and video files corresponding to photographs or individual video frames can be conveniently accessed and played back while the still photographs are being viewed.

SUMMARY OF THE INVENTION

The present invention is a photo book system and method with associated multimedia. One embodiment of the present invention provides a photo book including an image and an electronically readable code associated with the image. The electronically readable code is used for retrieving a multimedia file that corresponds to the image.

BRIEF DESCRIPTION OF THE DRAWINGS

FIG. 6 is a diagram illustrating one exemplary embodiment of an electronically readable code in accordance with the present invention.

FIG. 7 illustrates one exemplary embodiment of a photo book page incorporating the electronically readable code of FIG. 6 in accordance with the present invention.

FIG. 10 is a diagram illustrating another exemplary embodiment of an electronically readable code of the photo book system of the present invention.

FIG. 11 illustrates one exemplary embodiment of a photo book page incorporating the electronically readable code of FIG. 8 or 10 in accordance with the present invention.

DETAILED DESCRIPTION

In the following detailed description of the preferred embodiments, reference is made to the accompanying drawings which form a part hereof and show, by way of illustration, specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
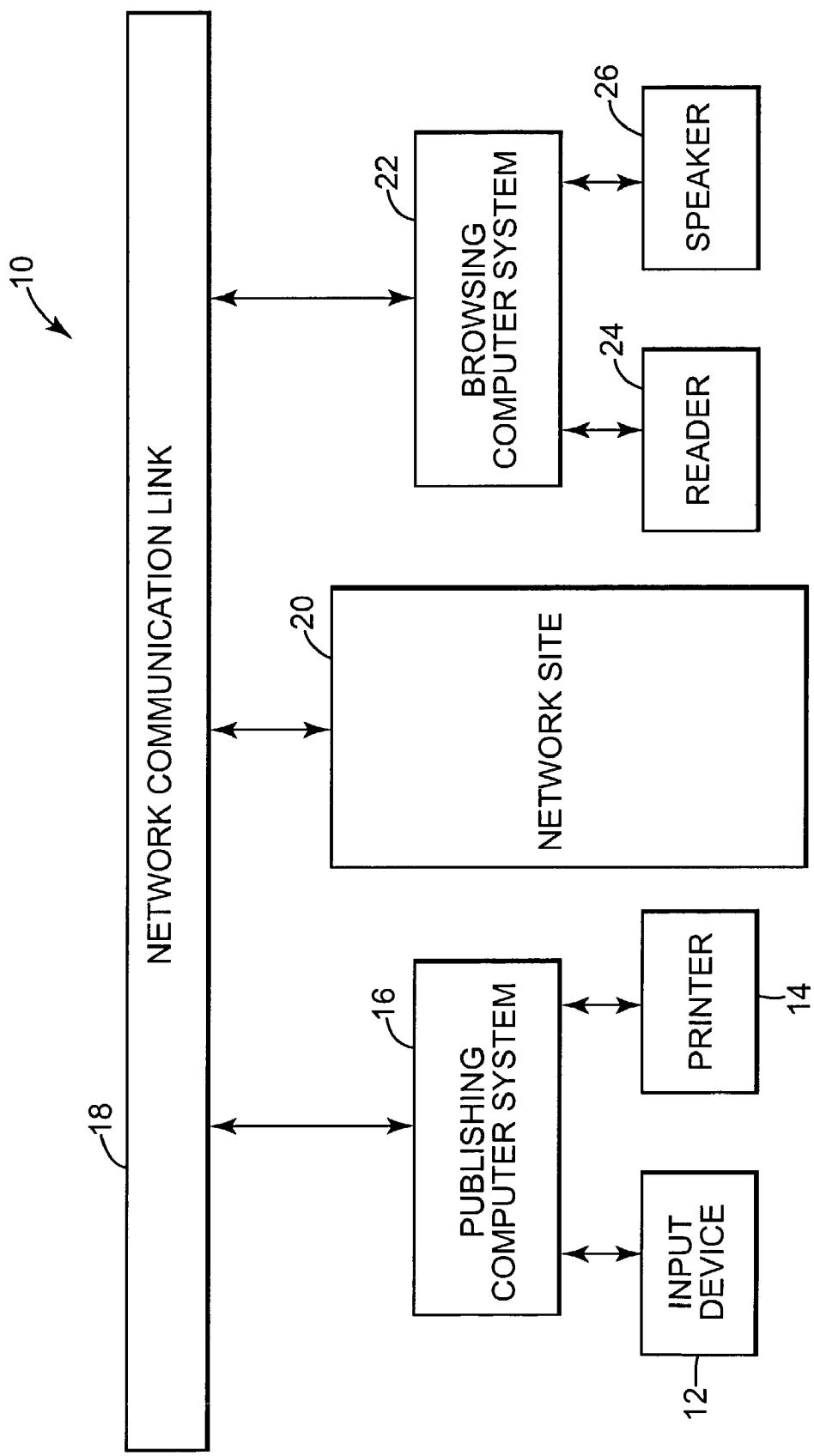
FIG. 1 is a block diagram illustrating one exemplary embodiment of a photo book system in accordance with the present invention.

FIG. 1 illustrates one exemplary embodiment of a photo book system and method of the present invention generally at 10. The photo book system 10 according to the present invention enables users to organize and share photographic images in conjunction with playing a media (e.g., an audio or video) file associated with each photographic image. The terms "media" or "multimedia" as used herein are defined to include audio, video or audio/video files. The user may incorporate an audio or video file collected with each photographic image or add an audio or video file at a subsequent time to each photographic image. The photo book system 10 provides each photographic image with a corresponding electronically readable code. Each electronically readable code contains an audio or video file or an address link to locate the audio or video file associated with each photographic image. Upon scanning the electronically readable code a viewing user may listen or watch the audio or video file corresponding with each photographic image.

Components of the present invention can be implemented in hardware via a microprocessor, programmable logic, or state machine, in firmware, or in software with a given device. In one aspect, at least a portion of the software programming is web-based and written in HTML and JAVA programming languages, including links to user interfaces for data collection, such as a Windows based operating system, and each of the main components may communicate via a network using a communication bus protocol. For example, the present invention may or may not use a TCP/IP protocol suite for data transport. Other programming languages and communication bus protocols suitable for use with the present invention will become apparent to those skilled in the art after reading the present application. Components of the present invention may also reside in software on one or more computer-readable mediums. The term "computer-readable medium" as used herein is defined to include any kind of memory, volatile or non-volatile, such as floppy disks, hard disks, CD-ROMs, flash memory, read-only memory (ROM), and random excess memory (RAM).

In one embodiment, the photo book system 10 includes an input device 12, a printer 14, a publishing computer system 16, a network communication link 18, a network site 20, a browsing computer system 22, a reader 24, and a speaker 26. In one preferred embodiment, publishing computer system 16 communicates with the network site 20 via the network communication link 18 to store audio and video files in memory and to generate an electronically readable code linking the audio or video file to a photo book image. Browsing computer system 22 communicates with the network site 20 via the network communication link 18 to retrieve files associated with the electronically readable code. In one aspect, network site 20 includes a computer system employing one or more web servers for communicating via communication link 18. Photo book system 10 is functionally divided into a publishing sub-system and a browsing sub-system. The publishing sub-system is illustrated in greater detail in FIG. 2 and the browsing sub-system is illustrated in greater detail in FIG. 4.

Figure 2:
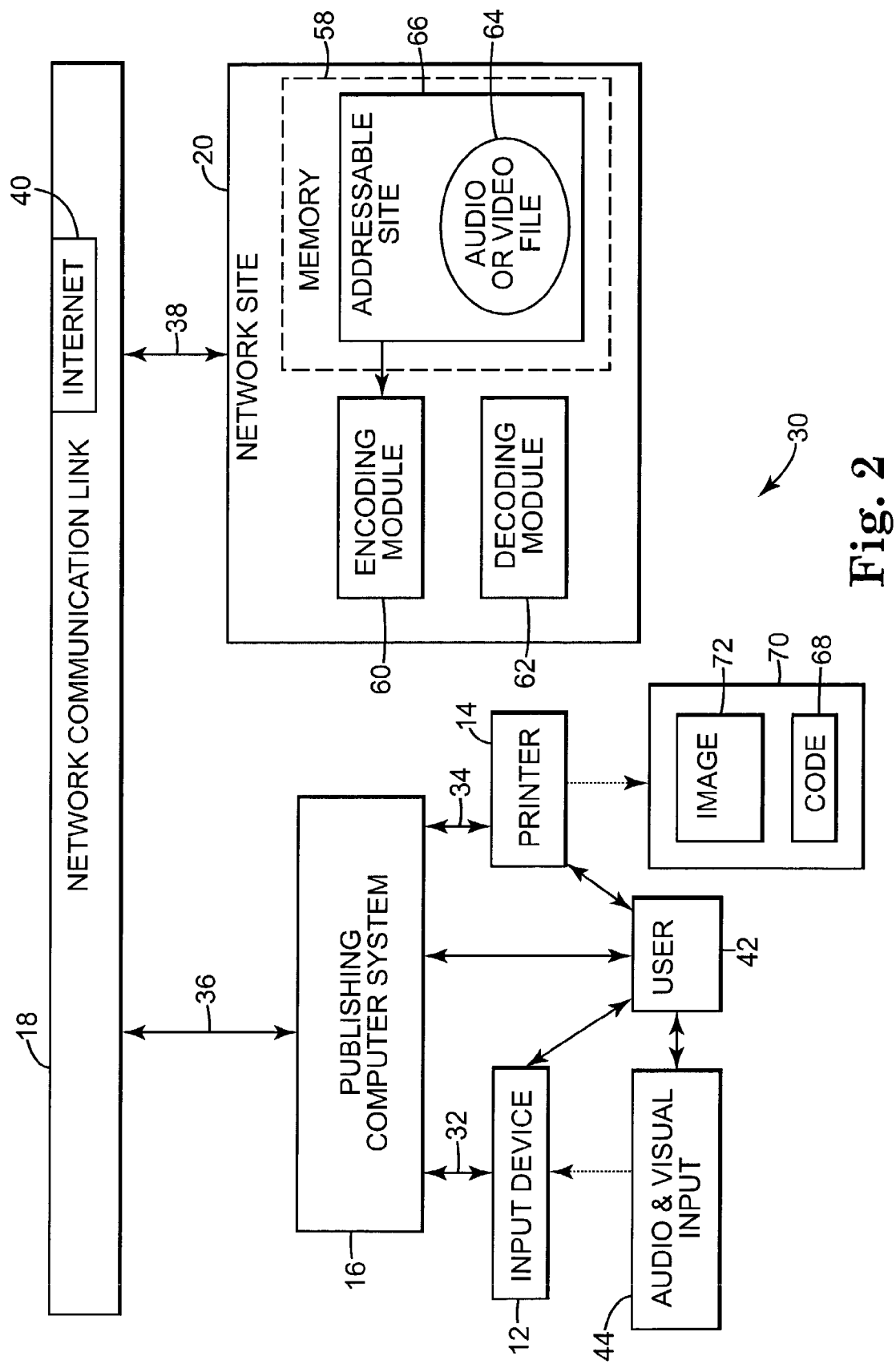
FIG. 2 is a block diagram illustrating one exemplary embodiment of a publishing sub-system of the photo book system of FIG. 1.

FIG. 2 is a diagram illustrating one exemplary embodiment of the publishing sub-system generally at 30. Publishing sub-system 30 includes input device 12, printer 14, publishing computer system 16, network communication link 18, and network site 20. Input device 12 and printer 14 are coupled to publishing computer system 16 via communication links 32 and 34, respectively. Publishing computer system 16 is coupled to network communication link 18 via a communication link 36. Network communication link 18 is coupled to network site 20 via a communication link 38.

Publishing computer system 16 may include, for example, additional input devices such as a keyboard and/or a mouse and a display device such as a monitor, as is well known in the art. In one exemplary embodiment, publishing computer system 16 runs an operating system which can support one or more applications. The operating system is stored in the memory of the publishing computer system. The operating system executes on a microprocessor and is preferably a multi-tasking operating system which allows simultaneous execution of multiple applications, although aspects of this invention may be implemented using a single-tasking operating system.

Network communication link 18, as used herein, includes an Internet communication link, an intranet communication link, or similar high-speed communication link. In one exemplary embodiment, network communication link 18 includes an Internet communication link 40. Internet communication link 40 permits communication between publishing computer system 16 and network site 20.

A user 42 is able to directly interact with input device 12, publishing computer system 16, and printer 14. The term "user," as used herein, is defined to include an entity or entities such as a consumer, an employee, or another entity capable of offering, providing, publishing, and/or posting an image to an automated printing system and/or capable of offering and scanning a scannable bar code and/or listening or viewing an audio or video file 64.

Figure 3:
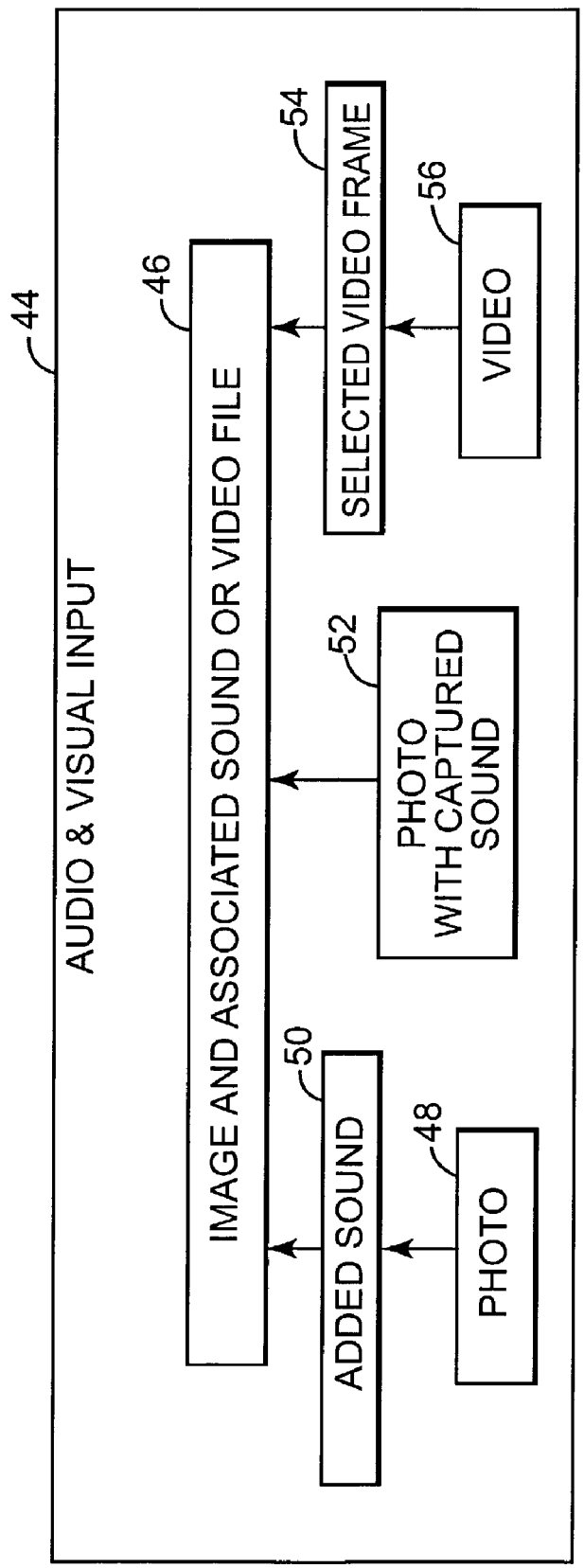
FIG. 3 is a block diagram illustrating one exemplary embodiment of an audio and visual input generally illustrated in FIG. 2.

User 42 provides an audio and visual input 44 to input device 12. FIG. 3 further illustrates audio and visual input 44, wherein audio and visual input 44 is more particularly an image in an associated sound or video file 46. Image and associated sound or video file 46 may be comprised of a photo 48 and a user added sound file 50, a photo with captured sound 52, or a selected video frame 54 and a video 56. Referring again to FIG. 2, audio and visual input 44 may be introduced to the publishing computer system 16 via communication link 32 and input device 12. Input device 12 may be a digital camera, a reader, a PDA, a pre-existing computer readable medium, or similar device as is know in the art. Audio and visual input 44 travels from the publishing computer system 16 via communication link 36, network communication link 18, and communication link 38 to network site 20.

Network site 20 includes a memory 58, an encoding module 60, and a decoding module 62. Audio and visual input 44 is stored in memory 58 as an audio or video file 64. More particularly, audio or video file 64 is stored at an addressable site 66 included in memory 58. Addressable site 66 has an address data set that is forwarded to encoding module 60. Encoding module 60 transforms the address data set into an electronically readable code 68 as is further described below. The newly created electronically readable code 68 is transferred via communication link 38, network communication link 18, and communication link 36 to publishing computer system 16.

Publishing computer system 16 forwards the electronically readable code 68 to printer 14 via communication link 34. Printer 14 prints electronically readable code 68 alone or with other electronically readable codes or with an image 72 as a photo book page 70 as will be described in greater detail below. The term "image," as used herein, is defined to include a photograph, an individual video frame, and/or other digital or electronic images. Image may be one or more images or subset of images. The process of publishing sub-system 30 of introducing audio and visual input, storing audio and visual input, creating an electronically readable code 68, and printing photo book page 70 may be repeated as necessary to produce a plurality of photo book pages, which can be collected and/or bound to form a photo book (not shown).

Upon printing, image 72 is immediately ready for viewing and sharing by user 42. In order for a user 42 to listen, view, or share the associated sound or video file 64, user 42 must utilize the browsing sub-system of photo book system 10.

Figure 4:
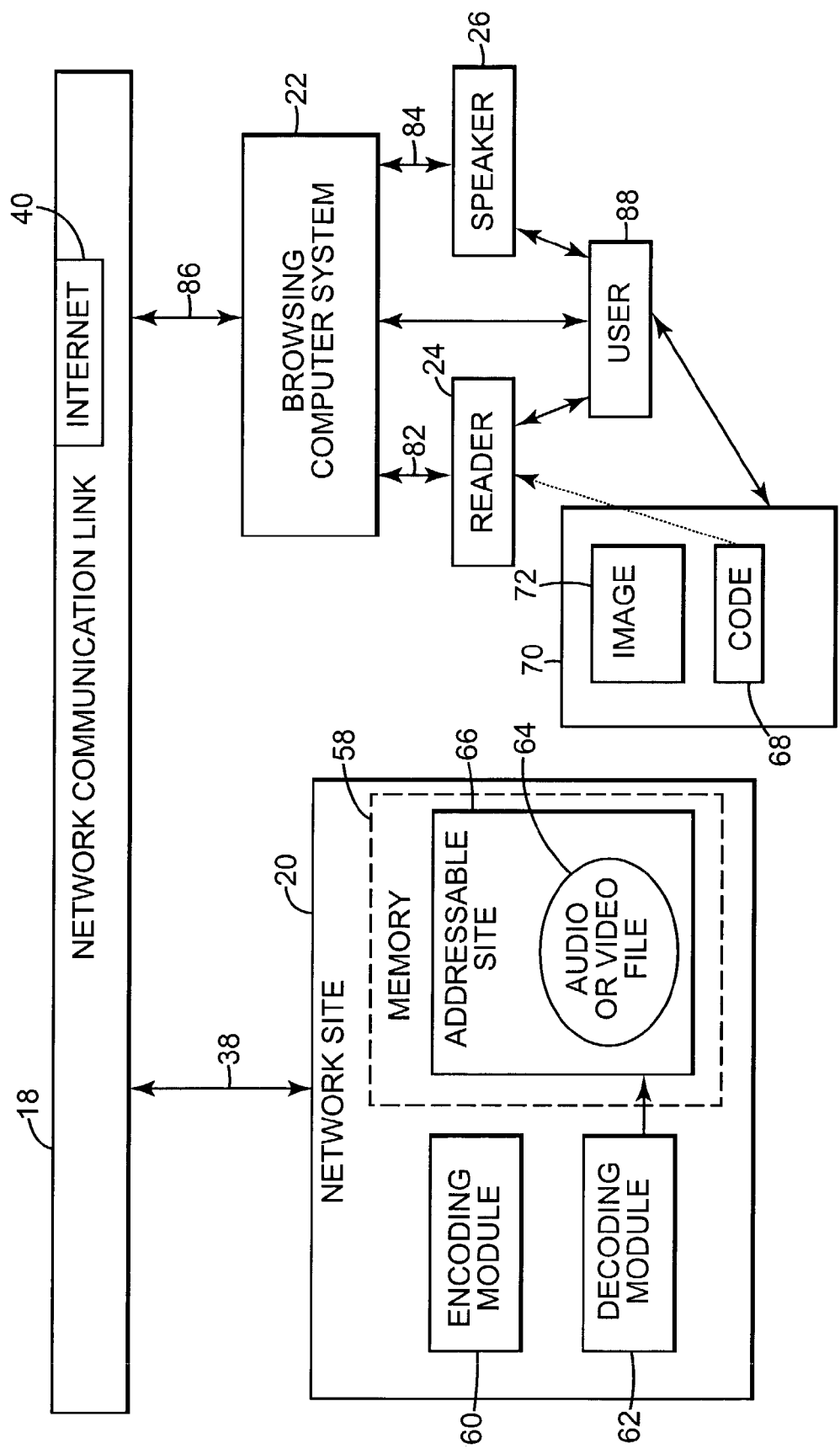
FIG. 4 is a block diagram illustrating one exemplary embodiment of a browsing sub-system of the photo book system of FIG. 1.

FIG. 4 illustrates one embodiment of a browsing sub-system 80 in accordance with the present invention. Browsing sub-system 80 includes reader 24, speaker 26, browsing computer system 22, network communication link 18, and network site 20. Although illustrated as two separate computer systems, browsing computer system 22 may be the same computer system as publishing computer system 16. Reader 24 and speaker 26 are coupled to browsing computer system 22 via communication links 82 and 84, respectively. Browsing computer system 22 is linked to network communication link 18 via a communication link 86. As previously described, network communication link 18 is coupled to network site 20 via communication link 38.

A user 88 is capable of freely interacting with reader 24, browsing computer system 22, and speaker 26. User 88 may be the same user 42 who activates the publishing sub-system 30 (FIG. 2). User 88 introduces electronically readable code 68 produced by publishing sub-system 30 to browsing computer system 22 by scanning electronically readable code 68 with reader 24. Reader 24 may be a digital camera, a PDA with camera, a reader, or similar device as is known in the art. Electronically readable code 68 is introduced to network site 20 via communication link 86, network communication link 18, and communication link 38.

Electronically readable code 68 is received by network site 20 and passes through decoding module 62, which converts electronically readable code 68 to the address data set of addressable site 66 where audio or video file 64 has been previously stored by the publishing sub-system 30. The address data set allows audio or video file 64 to be located. Once the audio or video file 64 is located it is retrieved and transferred to browsing computer system 22 via communication link 38, network communication link 18, and communication link 86. Associated audio or video file 64 is transmitted to user 88 via browsing computer system 22, communication link 84, and speaker 26. In another embodiment, the electronically readable code contains an index or a pointer to the address data set.

Figure 5:
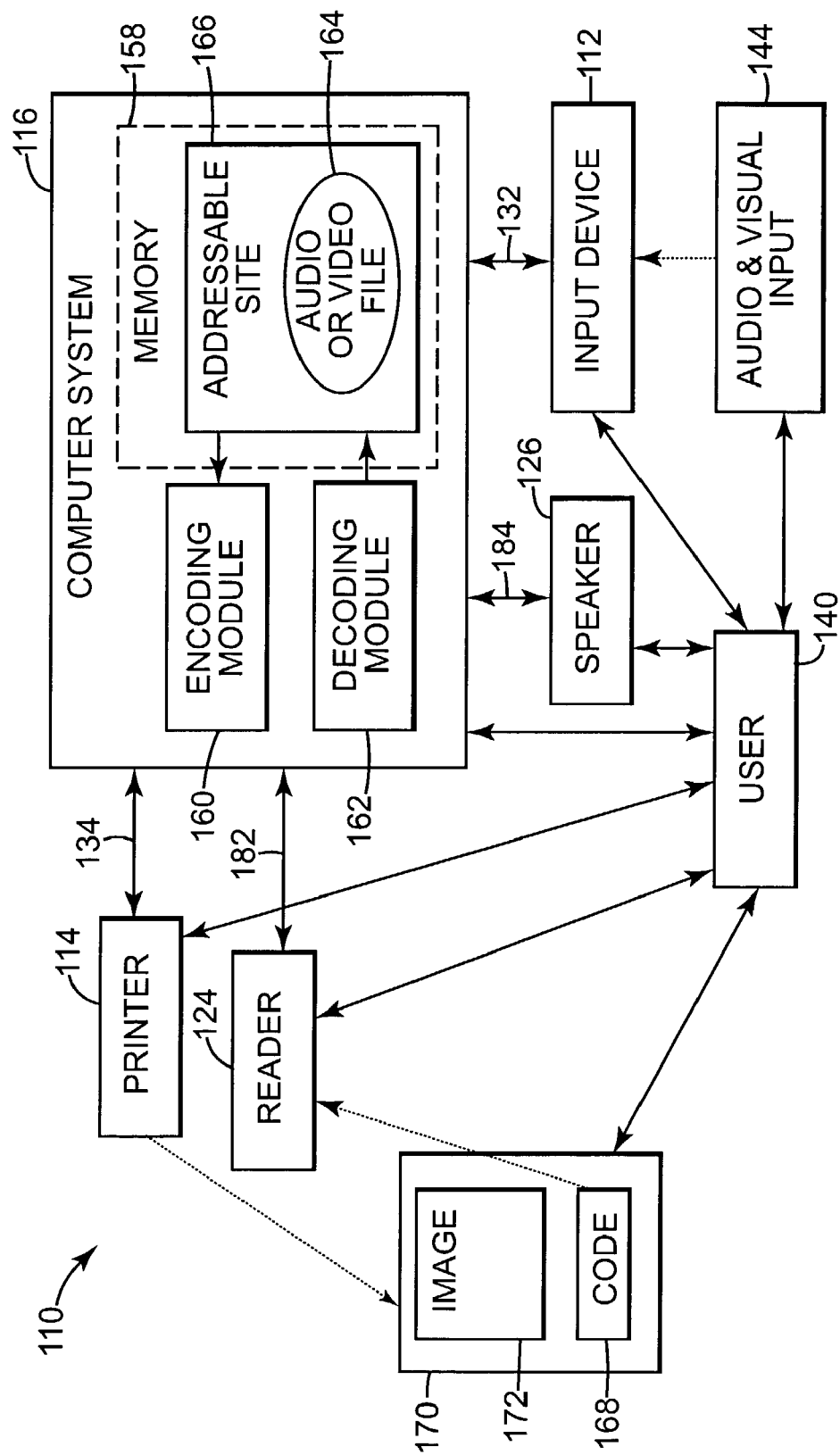
FIG. 5 is a block diagram illustrating another exemplary embodiment of the photo book system in accordance with the present invention.

FIG. 5 illustrates another embodiment of the photo book system in accordance with the present invention generally at 110. Photo book system 110 includes an input device 112, a printer 114, a computer system 116, a reader 124, and a speaker 126. Input device 112, printer 114, reader 124, and speaker 126 are coupled to computer system 116 via communication links 132, 134, 182, and 184, respectively. A user 140 has direct access to input device 112, computer system 116, printer 114, reader 124, and speaker 126. User 140 introduces an audio and video input 144 having similar characteristics as audio and video input 44 previously described and illustrated in FIG. 3. Audio and video input 144 is introduced to computer system 116 via input device 112 and communication link 132. Input device 112 has similar characteristics as input device 12 previously described.

Computer system 116 includes a memory 158, an encoding module 160, and a decoding module 162. Memory 158, encoding module 160, and decoding module 162 have similar characteristics as the memory 58, encoding module 60 and decoding module 62 previously described. Audio and visual input 144 is stored in memory 158 as an audio or video file 164. More particularly, audio and visual input 144 is stored at an addressable site 166 located in memory 158. An address data set of addressable site 166 where audio or video file 164 is stored is sent to encoding module 160. Encoding module 160 converts the address data set into an electronically readable code 168. Electronically readable code 168, described in greater detail below, is transferred from encoding module 160 of computer system 116 to printer 114 to be printed as a photo book page 170 alone or with an image 172 or other electronically readable codes (not shown). The process of inputting audio and visual input, creating electronically readable code 168, and printing photo book page 170 may be repeated as necessary to produce a plurality of photo book pages, which can be collected and/or bound to form a photo book (not shown).

Upon subsequent viewing of photo book page 170 user 140 may provide electronically readable code 168 to computer system via reader 124. Reader 124 is similar to reader 24 as previously described. Electronically readable code 168 travels from reader 24 via communication link 182 to computer system 116 where it enters decoding module 162. Decoding module 162 converts electronically readable code 168 into the address data set of addressable site 166 where audio or video file 164 is stored. The address data set allows computer system 116 to retrieve audio or video file 164 from memory 158 in order to present audio or video file 164 to user 140 via computer system 116 and speaker 126, thereby, allowing user 140 to view a video file or listen to an audio file associated with the image viewed.

Figure 5A:
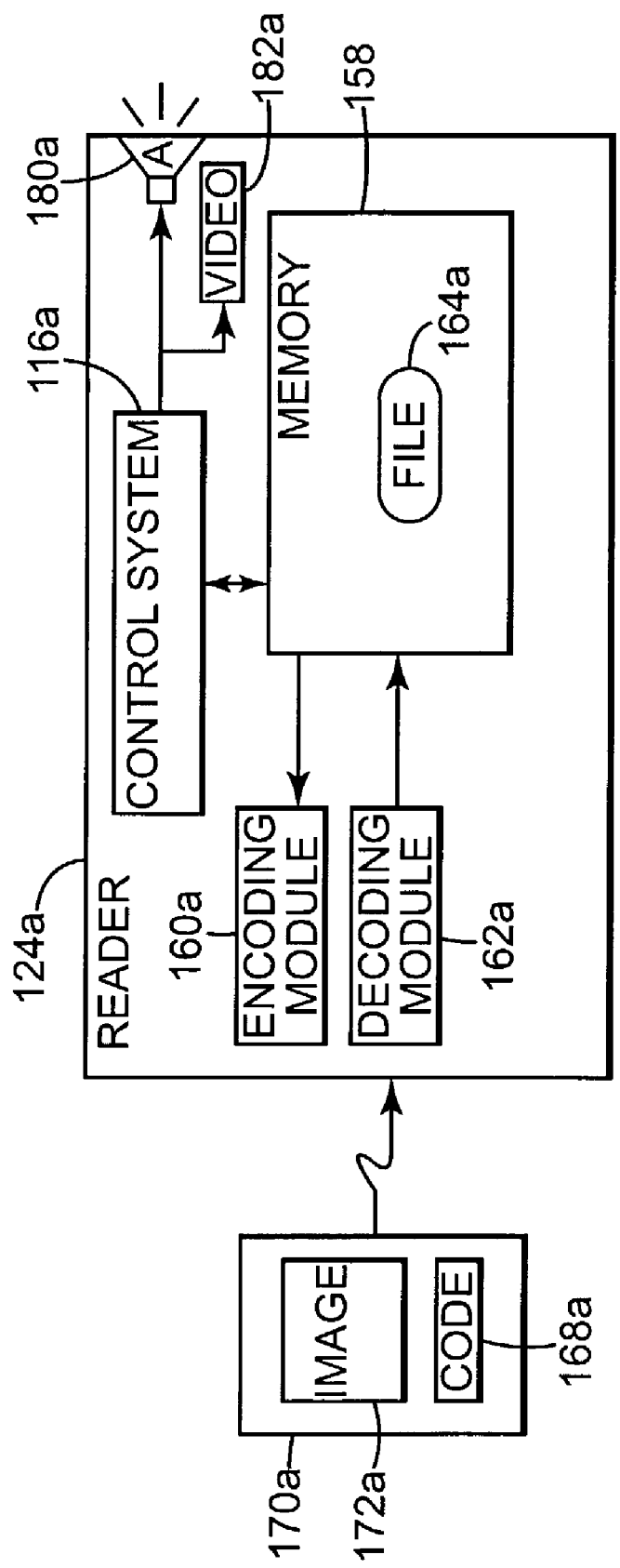
FIG. 5a is a block diagram illustrating another exemplary embodiment of a reader for use with a photo book system in accordance with the present invention.

FIG. 5a is a block diagram illustrating another exemplary embodiment of a reader for use with a photo book system in accordance with the present invention in which functions as described in conjunction with FIGS. 1, 2, 4 and 5 are consolidated within a scanner 124a. Reader 124a is similar to reader 124 and reader 24 previously described herein. The similar elements previously described herein are noted with a small "a" following the element number. Reader 124a includes decoding module 162a. Reader 124a is operated to scan code 168a. Decoding module 162a resident on reader 124a is used to decode the scanned code 168a and extract the raw data represented by the code 168a. Further, reader 124a may interpret the decoded raw data, and provide a corresponding pointer, index, or address (e.g., a URL) to a media file 164a associated with image 172a.

In one aspect, reader 124a may further include memory 158 having file 164a, control system 116a, decoding module 160a, audio output 180a and video output 182a. File 164a associated with image 172a is stored within reader 124a. Upon decoding of code 168a by decoding module 162a, corresponding audio and/or video file 164a is retrieved via control system 116a and output via audio output 180a or video output 182a. In one aspect, reader 124a is a hand-held computing device (e.g., a PDA or hand holdable computer).

As illustrated in FIG. 6, electronically readable code 200 may be a standard bar code 202 as is known in the art. Standard bar code 202 is a pattern of parallel bars and spaces of various widths that vary in a single dimension. The series of bars and spaces of a standard bar code 202 represent binary code, which in turn represents data elements or characters. Scanning of standard bar code 202 converts the code into electrical signals. Electrical signals are digitized and decoded to recover the original data set encoded in standard bar code 202.

As previously described, with respect to the publishing sub-system 30 and photo book system 110, an audio or video file 64 or 164 is saved in an addressable site 66 or 166 with a corresponding address data set. Encoding module 60 or 160 transforms the address data set with binary code into standard bar code 202 consisting of a series of bars and spaces representing the address. As illustrated in FIG. 7, standard bar code 202 may be printed upon a photo book sheet 210 adjacent to a related image 212. Upon subsequent viewing of photo book sheet 210, standard bar code 202 may be scanned into a computer system as previously described. The reader 24 or 124 converts the standard bar code 202 into electrical signals, which are subsequently digitized and decoded by decoding module 62 or 162 to recover the address data set corresponding to addressable site 66. Recovery of the address data set allows audio or video file 64 or 164 to be retrieved from addressable site 66 or 166 and presented to the user.

Figure 8:
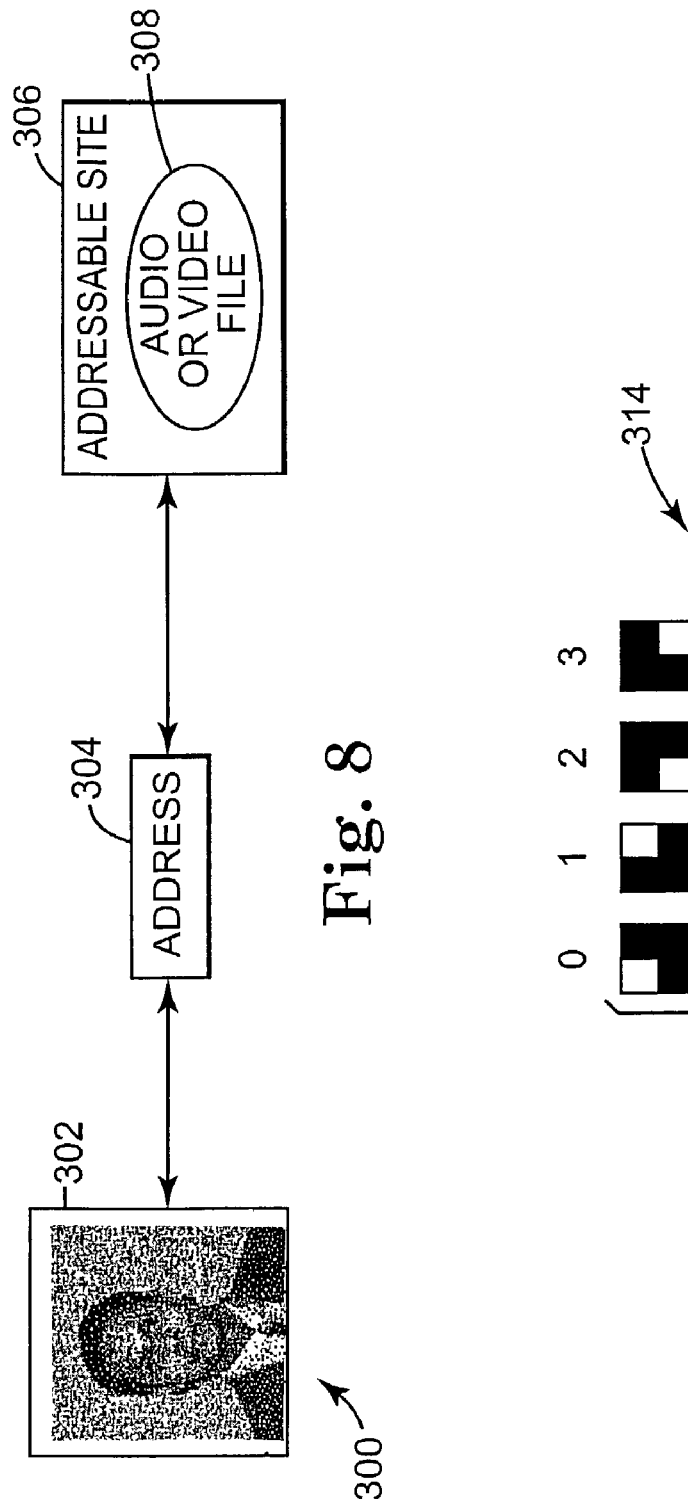
FIG. 8 is a diagram illustrating another embodiment of an electronically readable code of a photo book system of the present invention.
Figure 9:
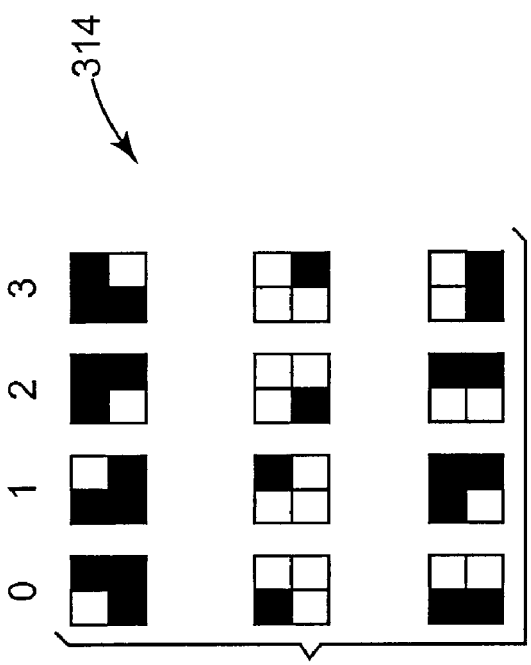
FIG. 9 is an illustration of a set of code word blocks utilized to create the electronically readable code of FIG. 8.

FIG. 8 illustrates another exemplary embodiment of an electronically readable code in accordance with the present invention generally at 300. Electronically readable code 300 may be a graphical bar code 302. Graphical bar code 302, termed an "image bar code", can appear similar to the picture with which it is associated. Graphical bar codes suitable for use with the present invention can be created in accordance with Non-Provisional U.S. patent application Ser. No. 10/027,523, entitled "Generating Graphical Bar Codes by Halftoning With Embedded Graphical Encoding,", filed on Dec. 19, 2001, assigned to the Assignee of the present invention, and previously incorporated herein by reference. In general, an original photo image is broken down in an encoding module 60 to form an intermediate halftone image composed of an array of blocks. Each block is a matrix composed of smaller solid white and solid color blocks. The intermediate halftone image is encoded with the one of a plurality of code blocks illustrated in FIG. 9 generally at 314. Similar to bar code 202 described above, code blocks 314 represent data elements and characters in binary form. Code blocks 314 are arranged to represent the data to be stored, and the code block arrangement is integrated with the intermediate halftone image to form the graphical bar code 302. Other suitable methods for generating a graphical bar code will become apparent to one skilled in the art after reading the present application.

General use of graphical bar code 302 is similar to the general use of standard bar code 202. Publishing sub-system 30 stores audio or video file 64 or 164 at addressable site 66 or 166 having an address data set. Encoding module 60 or 160 converts the address data set with binary code into graphical bar code 302 as previously described. Graphical bar code 302 is sent to printer 14 or 114 for printing upon an external medium. The printed graphical bar code 302 can subsequently be scanned into a computer system 22 or 116 and sent to a decoding module 62 or 162. Decoding module 62 or 162 converts graphical bar code 302 back into the address data set, thereby, allowing the audio or video file 64 or 164 to be located at addressable site 66 or 166. The located audio or video file 64 or 164 is transmitted back to user 88 or 140 for viewing and/or listening.

It should further be noted that graphical bar code 302 is comprised of code blocks 314 representing two-dimensional representation of coded data rather than the single dimensional coded data of a standard bar code 202. The two-dimensional bar code technology provides a graphical bar code 302 having a high-information capacity in comparison to the standard bar code 202. Due to the additional capacity of graphical bar code 302, as illustrated in FIG. 10, the data set stored in graphical bar code 302 may contain a short or abridged audio or video file 308. Thereby, the data set, itself, can serve as a direct communication link to the audio or video file and, consequently, obviates the need for a separate memory or an addressable site. Upon scanning and decoding of graphical bar code 302, the audio or video file 308 may be immediately played without need to access any external memory.

As shown in FIG. 11, graphical bar code 302 may be printed on a photo book page 310 adjacent to an original image 312 in a similar manner as described with respect to the standard bar code 202. Furthermore, since graphical bar code 302 is visually similar to the original image derived therefrom, each graphical bar code 302 may be positioned away from the original image without concern of user confusion regarding what image is related to what graphical bar code 302. In this respect, each graphical bar code 302 may be used as a thumbnail and/or a plurality of graphical bar codes (not shown) corresponding to different images may be printed to form an index page of graphical bar codes to be included in the photo book.

Figure 12:
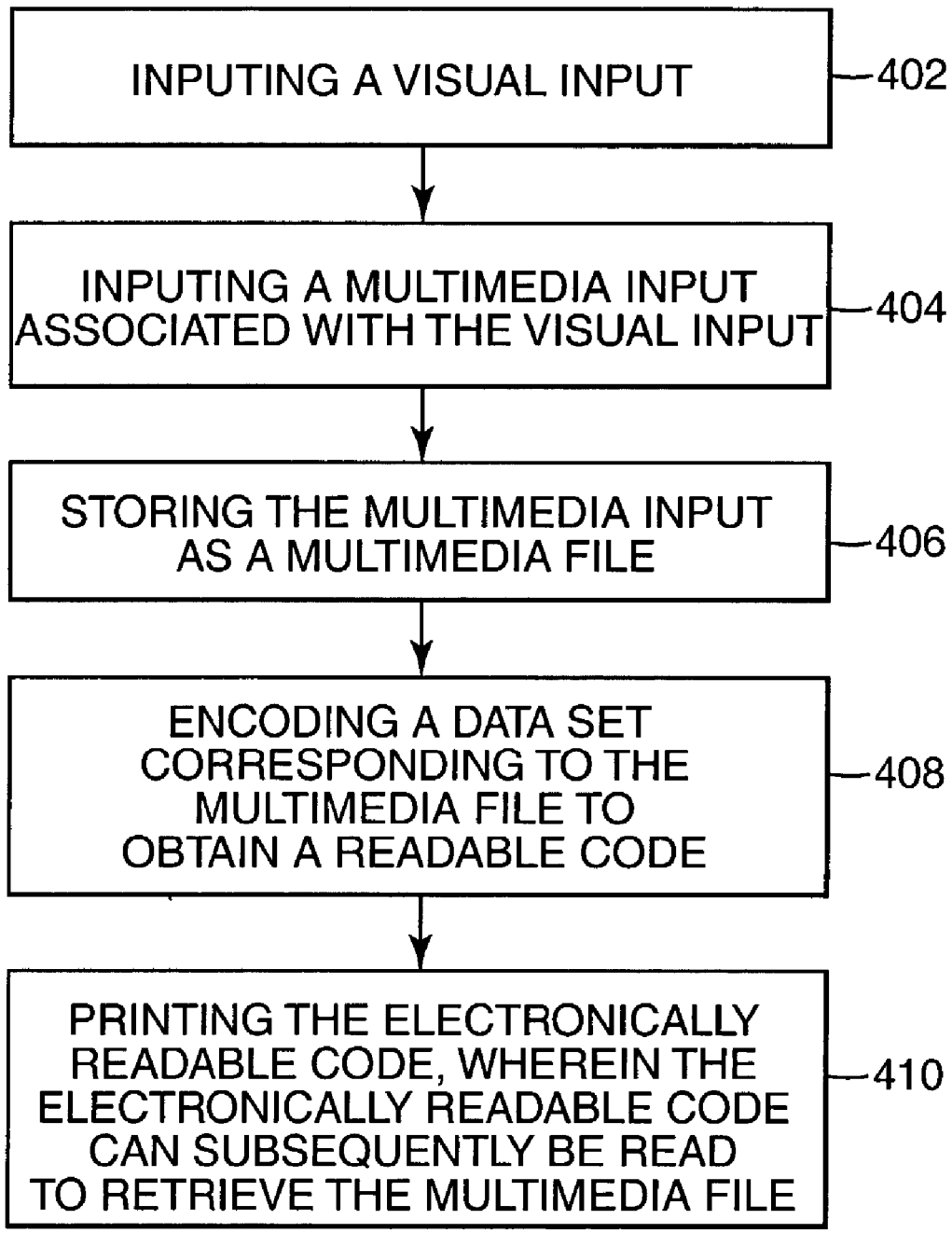
FIG. 12 is a flow diagram illustrating one exemplary embodiment of a method of publishing a photo book according to the present invention.

FIG. 12 is a diagram illustrating one exemplary embodiment of a method of publishing a photo book with a corresponding audio or video file according to the present invention. At 402, the method includes inputting a visual input. At 404, a multimedia input associated with the visual input is input. At 406, a multimedia input is stored as a multimedia file. At 408, a data set corresponding to the multimedia file is encoded to obtain a readable code. The data set corresponds with the audio or video file. At 410, the electronically readable code is printed, wherein the electronically readable code can subsequently be scanned to retrieve the multimedia file. The generated electronically readable code is representative of a pointer, index or address (e.g., URL) associated with the multimedia (audio or video) file, or may contain the multimedia file. In one aspect, the electronically readable code is a bar code. In another aspect, the electronically readable code is an image code.

Figure 13:
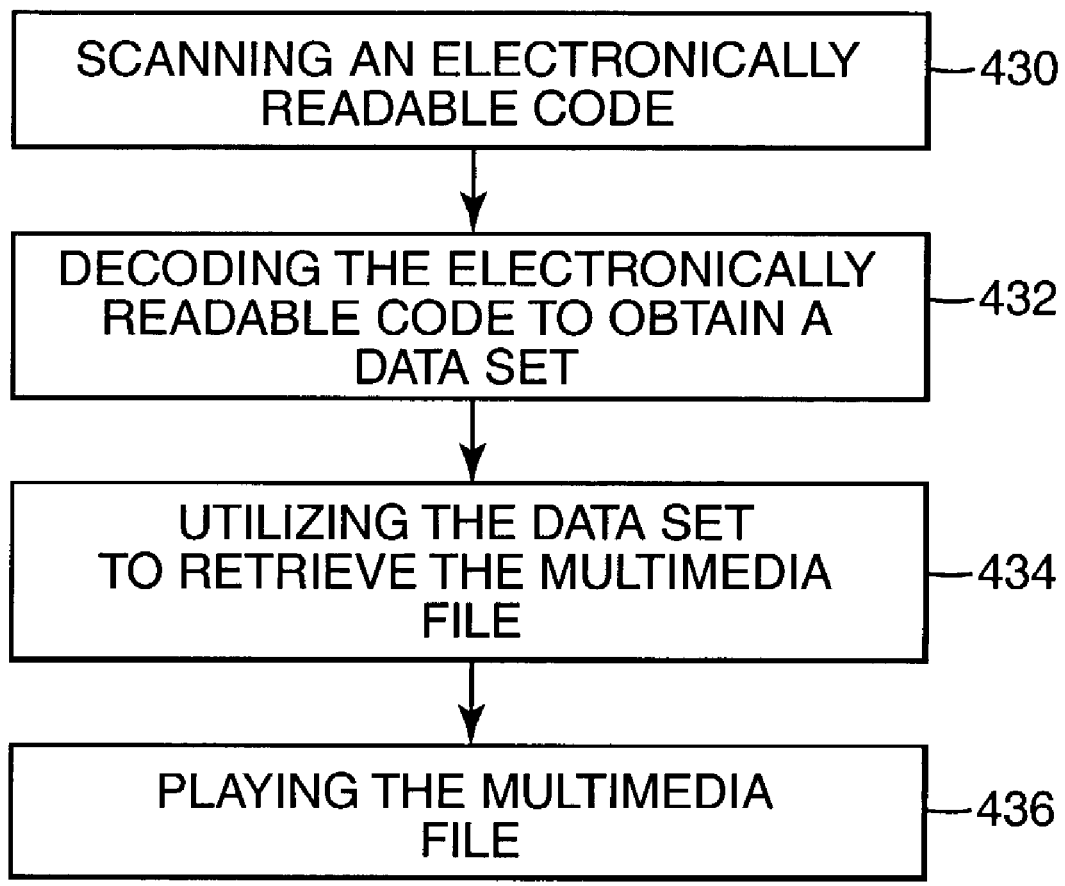
FIG. 13 is a flow diagram illustrating one exemplary embodiment of a method of browsing a photo book according to the present invention.

FIG. 13 is a diagram illustrating one exemplary embodiment of a method of browsing a photo book with a corresponding audio or video file according to the present invention. At 430, the method includes scanning an electronically readable code. The electronically readable code includes a data set corresponding with an audio or video file. The electronically readable code and the multimedia (audio or video) file are associated with an image in the photo book. At 432, the electronically readable code is decoded to obtain a data set. At 434, the data set is utilized to retrieve the multimedia file. In various aspects, the data set is a pointer, index, or address to the multimedia file, or contains the multimedia file itself. At 436, the multimedia file is played.

A method and system of the present invention for publishing and browsing a photo book incorporating communication links to audio or video files has many advantageous features. For example, the present invention maintains the ease of computer/digital photograph organization while simultaneously allowing the audio and video files corresponding with the photographs to be maintained in a convenient location for subsequent access. Furthermore, use of a graphical bar code allows the electronically readable code to be used as a thumbnail and/or located away from its associated photograph without causing user confusion as to the identity of the electronically readable code. The graphical bar code also allows associated audio or video files to be directly stored in the electronically readable code thereby negating the need for computer or network memory.

Although specific embodiments have been illustrated and described herein for purposes of description of the preferred embodiment, it will be appreciated by those of ordinary skill in the art that a wide variety of alternate and/or equivalent implementations may be substituted for the specific embodiment shown and described without departing from the scope of the present invention. Those with skill in the chemical, mechanical, electro-mechanical, electrical, and computer arts will readily appreciate that the present invention may be implemented in a wide variety of embodiments. This application is intended to cover any adaptations or variations of the preferred embodiments discussed herein. Therefore it is manifestly intended that this invention be limited only by the claims and the equivalence thereof.

What is claimed is:

1. A photo book for use with a photo book system including an electronic reader, the photo book comprising:
    an individual image;
    a multimedia file associated with the individual image; and
    an electronically readable code separate from and associated with the individual image and encoded with data configured to be electronically read by the reader for retrieving the multimedia file,
    wherein the electronically readable code is a graphical bar code that visually resembles the individual image such that the graphical bar code is useable as a thumbnail for the individual image, and
    wherein the graphical bar code includes a plurality of code blocks providing a two-dimensional representation of the data, the plurality of code blocks integrated with an intermediate halftone image of the thumbnail for the individual image.

2. The photo book of claim 1, wherein the electronically readable code is located on a printed medium.

3. The photo book of claim 1, wherein the graphical bar code contains the multimedia file.

4. The photo book of claim 1, wherein the multimedia file is encoded within the readable code.

5. The photo book of claim 1, wherein the readable code provides a communication link to the multimedia file.

6. The photo book of claim 5, wherein the communication link is a network communication link.

7. The photo book of claim 5, wherein the communication link includes the Internet.

8. The photo book of claim 7, wherein an electronically readable code is configured to be read by one of a reader, a digital camera, or a PDA with camera.

9. The photo book of claim 7, wherein the electronically readable code corresponds to a web address to a network site.

10. The photo book of claim 5, wherein reading an electronically readable code activates the communication link to the multimedia file.

11. The photo book of claim 1, wherein the photo book includes a plurality of individual images and a plurality of electronically readable codes, each electronically readable code being associated with a corresponding one of the plurality of individual images.

12. The photo book of claim 1, wherein the intermediate halftone image comprises an array of blocks, each bock comprising a matrix of smaller solid white and solid color blocks, and
    wherein each code block represents a data element in binary form.

13. A network site for serving a photo book including at least one image having associated multimedia comprising:
    an encoding module configured to encode a data set corresponding to the multimedia into an electronically readable code, wherein the electronically readable code is an image bar code that visually resembles the at least one image such that the image bar code is useable as a thumbnail for the at least one image, the image bar code including a plurality of code blocks providing a two-dimensional representation of the data set, the plurality of code blocks integrated with an intermediate halftone image of the thumbnail for the at least one image; and
    a decoding module configured to convert an electronically readable code into the data set.

14. The network site of claim 13, wherein the network site is an Internet site.

15. The network site of claim 13, wherein the network site further includes
    a memory comprising:
    an addressable site corresponding with an electronically readable code, the addressable site having an address, the address corresponding to the data set; wherein the multimedia file is stored at the addressable site.

16. The network site of claim 15, wherein the data set includes an address pointer or an index corresponding to the addressable site where the multimedia is stored.

17. A method of publishing a photo book with a corresponding multimedia file, the method comprising:
    inputting a visual input;
    inputting a multimedia input associated with the visual input;
    storing the multimedia input as a multimedia file;
    generating an electronically readable code encoded with a data set, the data set corresponding with the multimedia file, wherein the electronically readable code is a graphical bar code that is separate from the visual input and that visually resembles the visual input such that the graphical bar code is useable as a thumbnail for the visual input, the graphical bar code including a plurality of code blocks providing a two-dimensional representation of the data set, the plurality of code blocks integrated with an intermediate halftone image of the thumbnail for the visual input; and
    printing the electronically readable code, wherein the electronically readable code can subsequently be read to retrieve the data set and is usable to form an index page for the photo book in which the electronically readable code is visually associated with the visual input.

18. The method of claim 17, wherein storing the multimedia input further includes storing the multimedia input at an addressable site, and the data set corresponds with the addressable site.

19. The method of claim 18, wherein an electronically readable code encodes a pointer, index or URL associated with the data set.

20. The method of claim 17, wherein the data set encoded within the electronically readable code is the multimedia file.

21. The method of claim 17, wherein the intermediate halftone image comprises an array of blocks, each bock comprising a matrix of smaller solid white and solid color blocks, and wherein each code block represents a data set element in binary form.

22. A method of browsing a photo book with a corresponding multimedia file, the method comprising:

scanning an electronically readable code, wherein the electronically readable code encodes a data set corresponding with a multimedia file, and the electronically readable code and the multimedia file are each associated with an individual image within the photo book, wherein the electronically readable code is an image bar code that is separate from the individual image and that visually resembles the individual image such that the image bar code is useable as a thumbnail for the individual image, and wherein the image bar code includes a plurality of code blocks providing a two-dimensional representation of the data set, the plurality of code blocks integrated with an intermediate halftone image of the thumbnail for the individual image;

decoding the electronically readable code to recover the data set corresponding to the multimedia file;

utilizing the data set to retrieve the multimedia file; and playing the multimedia file.

23. The method of claim 22, wherein data set includes an address, pointer or index to an addressable site, and the addressable site contains the multimedia file.

24. The method of claim 22, wherein the data set is the multimedia file.

25. A computer-readable medium having computer-executable instructions for performing a method of publishing a photo book with a corresponding multimedia file comprising:

inputting a visual input;

inputting a multimedia input associated with the visual input;

storing the multimedia input as a multimedia file;

generating an electronically readable code to store a data set, the data set corresponding with the multimedia file, wherein the electronically readable code is a graphical bar code that is separate from the visual input and that visually resembles the visual input such that the graphical bar code is useable as a thumbnail for the visual input, the graphical bar code including a plurality of code blocks providing a two-dimensional representation of the data set, the plurality of code blocks integrated with an intermediate halftone image of the thumbnail for the visual input; and printing the electronically readable code, wherein the electronically readable code can subsequently be electronically scanned to retrieve the data set.

26. The computer-readable medium of claim 25, wherein the intermediate halftone image comprises an array of blocks, each bock comprising a matrix of smaller solid white and solid color blocks, and wherein each code block represents a data set element in binary form.

27. A computer-readable medium having computer-executable instructions for performing a method of browsing a photo book with a corresponding multimedia file comprising:

scanning an electronically readable code, wherein the electronically readable code includes a data set corresponding with a multimedia file, and the electronically readable code and the multimedia file are each associated with an individual image;

decoding the electronically readable code to recover the data set corresponding to the multimedia file;

utilizing the data set to retrieve the multimedia file; and playing the multimedia file;

wherein the electronically readable code is a graphical bar code that is separate from the individual image and that visually resembles the individual image such that the graphical bar code is useable as a thumbnail for the individual image, the graphical bar code including a plurality of code blocks providing a two-dimensional representation of the data set, the plurality of code blocks integrated with an intermediate halftone image of the thumbnail for the individual image.

28. The computer-readable medium of claim 27, wherein the intermediate halftone image comprises an array of blocks, each bock comprising a matrix of smaller solid white and solid color blocks, and wherein each code block represents a data set element in binary form.

29. A photo book for use with an electronic photo book system including a reader, the photo book comprising:

an image having an associated multimedia file; and an electronically readable graphical bar code visually representative of and separate from the image and encoded with data corresponding to a location where the multimedia file is stored such that the graphical bar code is useable as a thumbnail for the image, wherein the graphical bar code is configured to be scanned by the reader of the electronic photo book system to decode the data, and wherein the graphical bar code includes a plurality of code blocks providing a two-dimensional representation of the data, the plurality of code blocks integrated with an intermediate halftone image of the thumbnail for the image.

30. The photo book of claim 29, comprising:

wherein the image is a picture; and wherein the graphical bar code comprises a second picture similar to the image.

31. The photo book of claim 30, wherein the graphical bar code includes a halftone image with embedded graphical encoding.

32. The photo book of claim 31, wherein the graphical bar code includes the associated multimedia file encoded therein.

33. The photo book of claim 32, wherein the multimedia file includes audio.

* * * * *